United States Patent [19]

Esposito

[11] Patent Number: 4,601,139
[45] Date of Patent: Jul. 22, 1986

[54] METHOD AND FRAMEWORK FOR A GREENHOUSE OR THE LIKE INCLUDING A REVERSIBLE GABLE ADAPTOR

[75] Inventor: Joseph Esposito, Dix Hills, N.Y.

[73] Assignee: Four Seasons Solar Products Corp., Farmingdale, N.Y.

[21] Appl. No.: 596,091

[22] Filed: Apr. 2, 1984

[51] Int. Cl.$^4$ .......................... E04B 7/02; E04B 1/38
[52] U.S. Cl. ........................................ 52/90; 47/17; 403/199
[58] Field of Search .................. 52/90, 93, 704, 512; 256/65, 69; 403/199, 187; 47/17

[56] References Cited

U.S. PATENT DOCUMENTS

| 363,227 | 5/1887 | Hamilton | 256/65 |
|---|---|---|---|
| 689,134 | 12/1901 | Sefton | 52/90 |
| 1,103,773 | 7/1914 | Jacobs | 47/17 |
| 1,258,408 | 3/1918 | Hill | 52/90 |
| 1,484,053 | 2/1924 | Bayley | 52/704 |
| 1,932,554 | 10/1933 | McKee | 47/17 |
| 2,181,740 | 11/1939 | Reilano | 52/704 |
| 2,199,533 | 5/1940 | Wuellner | 52/704 |
| 2,654,579 | 10/1953 | Cremens | 256/65 |
| 3,063,104 | 11/1962 | Troxel | 47/17 |
| 3,150,463 | 9/1964 | Nearing et al. | 47/17 |
| 3,562,972 | 2/1971 | D'Amato | 47/17 |
| 3,738,083 | 6/1973 | Shimano | 52/582 |
| 3,783,563 | 1/1974 | Moore | 52/90 |
| 4,018,213 | 4/1977 | Mann, Jr. | 47/17 |
| 4,187,655 | 2/1980 | Anderson | 52/90 |
| 4,227,464 | 10/1980 | Wallace | 403/199 |
| 4,399,738 | 8/1983 | Sharkey | 47/17 |

FOREIGN PATENT DOCUMENTS

| 2013449 | 9/1971 | Fed. Rep. of Germany | 256/65 |
| 466365 | 5/1937 | United Kingdom | 403/199 |

Primary Examiner—Carl D. Friedman
Assistant Examiner—Michael Safavi
Attorney, Agent, or Firm—Roberts, Spiecens & Cohen

[57] ABSTRACT

A greenhouse with two gable ends formed of a framework which extends between the ends and which includes a sloped roof or eave and also includes sloped gable end bars supported atop vertical bars included in the gable ends. Wedge shaped gable adaptors of reversible configuration are inserted between the tops of the vertical bars and the lower surfaces of the sloped bars to provide a firm support for the sloped bars and a connection between the vertical and sloped bars. The vertical bars are of like configuration in cross-section and are aluminum extrusions arranged in mirror image of each other. Use of the reversible adaptors enable the same extrusion design to be used on opposite ends of the greenhouse. The adaptor structure includes prongs which are inserted into the extrusions which are hollow. The prongs have relative lengths and widths which facilitate mounting of the adaptors in the partially erected greenhouse. The mounting method includes bolting the adaptors to the bars by the use of openings provided in the adaptors for this purpose. Shims are employed with a design to enable the insertion of the same after the adaptors have been connected to the bars.

19 Claims, 14 Drawing Figures

METHOD AND FRAMEWORK FOR A GREENHOUSE OR THE LIKE INCLUDING A REVERSIBLE GABLE ADAPTOR

FIELD OF INVENTION

This invention relates to greenhouses and like structures including frameworks supporting glazings or the like. The invention also relates to associated methods.

BACKGROUND

Greenhouses or solariums are being used in increasing frequency for home improvement as the ideal solution for adding space and developing an outdoor feeling at relatively low cost and with minimum effort. These greenhouses or solariums (these terms may be used interchangeably herein) are glass enclosures wherein glazing may be supported on frameworks consisting, for example, of lattices or the like fabricated of aluminum extrusions or bars developed to provide for various ancillary functions. These functions and the associated features which permit them to be realized include shading tracks to provide for the raising and lowering of shades, the interconnection of multiple bars, the accomodation of glazing panels with thermal breaks, "weeping" designs to avoid the accumulation of excess moisture, the attaching of internal and external auxiliary members, and the like.

Since the design of the aforesaid extrusions is intended to incorporate so many features and provide for so many functions, the resulting extrusions are often complex. As will be discussed below, they sometimes have exterior and interior halves or parts which are not positionally interchangeable even though they may be symmetrical about a given longitudinal plane.

The aforesaid design characteristic is significant in the erecting of frameworks of particular types. For example, certain lean-to type greenhouses have frameworks which terminate in lefthand and righthand gable ends between which extend a vertical front having a sloped eave which slopes downwardly away from a supporting structure such as a dwelling. The sloped eave will include sloped glazing bars which lie generally in the planes of the gable ends wherein they are supported atop vertical glazing bars.

If, in the above structure, the vertical glazing bars and the sloped glazing bars are to fit snugly together, it is necessary to mitre or slope the top ends of the vertical bars so that the bottom surfaces of the sloped glazing bars can rest flatly against the same. Brief consideration of this arrangement will lead to the realization that different mitres will have to be used for vertical bars in the lefthand and righthand gable ends respectively, unless the vertical bars are completely symmetrical in cross-section.

In most cases, however, the vertical glazing bars are are not completely symmetrical. They have exterior and interior portions which always must face the exterior and interior of the associated greenhouse enclosure whether they are in the lefthand or righthand gable end. This means that a different or reversed mitre must be provided for the lefthand end than for the righthand end for, if the same mitre were to be provided for the tops of all end vertical bars, the mitre would be correct for one end and reversed or improper for the other end. This is due to the fact that the vertical bars in the opposite gable ends have to be mounted in mirror image (i.e., rotated one hundred and eighty degrees) with respect to one another to maintain the proper interior-exterior alignment.

In actual construction, this leads to a problem. It means that two sets of vertical bars have to be made. One set is mitred for the lefthand gable end and the other set is mitred for the righthand gable end. This turn means that it is necessary to manufacture and inventory two separate kinds of gable-end vertical bars with respectively opposite mitres and leads to other complications as well. For example, if the oppositely mitred bars are accidentally mounted in the wrong gable ends, the structure has to be dismantled and reassembled. The problems are all the more accentuated when the greenhouses or solariums are shipped in dismantled form as "do-it-yourself" kits. The problems also include increased manufacturing costs.

SUMMARY OF INVENTION

It is an object of the invention to provide for improved lattice or framework constructions for greenhouses, solariums and the like.

More specifically, it is an object of the invention to provide an improved framework design wherein the vertical bars in opposite ends may be of universal cross-section design while never-the-less providing appropriate mitres for supporting the respective sloped glazing bars associated therewith.

Still another object of the invention, as will be seen, is to provide a reversible and universal adaptor suitable for use in the frameworks of opposite gable ends in greenhouses or solariums.

Yet another object is to provide for accommodating dimensional discrepancies in gable ends by the use of shims of improved and universal design.

It is yet another object of the invention to provide improved methods relating to the erection of glazing supports.

In achieving the above and other objects of the invention, there is provided a light-permeable structure which comprises an open framework with a light-permeable glazing being provided on the structure to define an enclosure. The framework includes opposed sections or ends including respective vertical structural members of like construction and in mirror image of each other. The framework further includes sloped members adapted to rest atop the vertical members and defining therewith and above the same wedge shaped openings. Wedge shaped members or adaptors of like conformation are mounted between the vertical and sloped members to support the sloped members on respective of the vertical members. The wedge shaped members have surfaces to rest atop the vertical members and to rest against the sloped members. The wedge shaped members are of a configuration to be interchangeably mounted between either of the vertical members and the corresponding sloped member and the wedge shaped members are furthermore connectible to one or both of the vertical and sloped members. The vertical members can be arbitrarily mounted in either of the opposed sections or ends.

As will be explained in greater detail hereinbelow, each vertical member has a longitudinal plane of symmetry and the associated wedge shaped member has a sloped surface which slopes athwart this plane. Preferably the vertical members are hollow extrusions having like cross-sections and defining like internal bores. The wedge shaped members, as will be shown hereinbelow, include prongs extending into the bores to locate and brace the wedge shaped members on the vertical members. As will further be shown hereinafter, fastening members connect the wedge shaped members to the respective vertical and sloped members which are provided with receptacles to receive respective of the fastening members.

It will be explained hereinbelow that each sloped member has an elongated face facing the associated vertical member and provided with one of the receptacles running longitudinally therealong. The wedge shaped members are each provided with at least one elongated opening aligned with the receptacle noted above and to accommodate one of the previously mentioned fastening members. Each vertical member is provided with one of the receptacles opening endwise therein and the corresponding wedge shaped member is provided with a corresponding further opening to accommodate one of the fastening members therein.

Another feature of the invention relates to the the provision of a shim between the vertical members and the associated wedge shaped members to provide a snug fit between the wedge shaped member and vertical and sloped members. This shim as will be shown hereinbelow is a flat generally C-shaped member with an open end to permit bypassing the prongs. More particularly, the C-shaped member includes spaced legs straddling the prongs and including notches in which at least one of the prongs is engaged. Furthermore the C-shaped member includes a bight connecting the legs and provided with an opening corresponding with one of the openings in the wedge shaped member to accommodate the passage therethrough of the related fastening member. The aforesaid legs are resiliently spreadable and include claws at the respective ends thereof.

It will also be explained in the detailed description which follows below that each vertical member is preferably provided with a flat top end and it will also be seen that the wedge shaped member inclusive of the prongs extending therefrom are each monolithic plastic members whereas the vertical and sloped members are respectively aluminum extrusions. It may also appear that each vertical member has a bottom which slopes transversely of the sloped surface of the wedge shaped member and that the vertical members are wider than the sloped members.

In accordance with a further feature of the invention, each wedge shaped member is provided with two interdigitated sets of openings. One set of openings of one wedge shaped member is aligned with the receptacles of the corresponding vertical member and the corresponding sloped member. The other set of openings of the other wedge shaped member is aligned with the receptacles of the other vertical member and corresponding sloped member.

Considered with respect to the reversible adaptor provided in accordance with the invention independently of the environmental structure into which it is incorporated, the reversible gable end adaptor provided in accordance with the invention includes a wedge shaped block having a generally flat bottom and a sloped top and three flat prongs extending in spaced parallel relation from the bottom of the block. The block is provided with laterally located holes straddling the prongs and parallel therewith. The holes have enlarged portions countersunk into the sloped top. The block is furthermore provided with two sets of elongated holes parallel to and between respective pairs of the prongs. These prongs are preferably configured as flat parallel elements arranged as two outer and one central element. The central element is wider than the two outer elements and has a sloped bottom end. The other elements have flat bottom ends parallel with the flat bottom of the block.

According to features of the structure of the reversible gable adaptor, this adaptor has its sloped top terminating in rounded edges. Moreover, the block bottom is generally of rectangular shape. The shim referred to hereinabove is a flat C-shaped shim resting against the block bottom and including a bight provided with a hole aligned with one of the aforesaid laterally located holes as noted above. This shim includes the two parallel legs referred to hereinabove configured and arranged as aforesaid and as to be described in greater detail hereinbelow.

In further accordance with the invention there is provided a method of mounting sloped glazing bars on the flat tops of two generally identical hollow vertical bars arranged in mirror image relation. The method of the invention comprises molding two plastic wedges with prongs extending therefrom and arranging the wedges between the respective of the sloped bars and flat tops with the prongs inserted into the hollow bars. According to another aspect of the invention, there is comprised the step of attaching the wedges to the sloped bars whereafter the prongs are inserted into the hollow vertical bars and the wedges are fastened to the vertical bars.

According to another feature of the method of the invention, the vertical bars are arranged in mirror image of each other and the sloped bars are arranged to slope in the same direction of slope. Furthermore, shims of the aforenoted construction are arranged between the wedges and vertical bars with the shims each engaging a respective one of the aforementioned prongs.

The invention may also be considered in terms of providing a greenhouse or solarium or the like which comprises a framework arrangement with glazing being provided on this framework to define an enclosure therewith. The framework arrangement includes spaced ends, a front between these ends and a sloped eave extending from the front and extending between the ends. The ends each include at least one vertical bar as noted above having a top with the eave including spaced sloped bars adapted for being supported at least in part atop respective of the vertical bars. In accordance with the invention, an adaptor is provided between each of the sloped bars and the corresponding top of the corresponding vertical bar. The adaptors each have sloped surfaces at least in part supporting the sloped bars.

According to a feature of the aforesaid structure, the vertical bars are of the same cross-section and have horizontal planar tops. The adaptors each have horizontal surfaces resting on these tops.

Other objects, features and advantages of the invention will be found in the detailed description which follows hereinbelow as illustrated in the accompanying drawing.

DETAILED DESCRIPTION

In the description which follows, the terms "greenhouse" and "solarium" are used interchangeably and are intended to include and be representative of various types of structures or parts of structures including but not limited to enclosures fabricated or not with glass or plastic glazing permeable to solar flux. The terms "lattice" and "framework" are intended to include all kinds of arrangements of structural members arranged in any kind of intersecting, abutting or adjoining relationship or the like. The terms "bars" or "extrusions" are intended to include structural members of metal or plastic or the like, preferably aluminum, manufactured by any process or combined processes.

Figure 1:
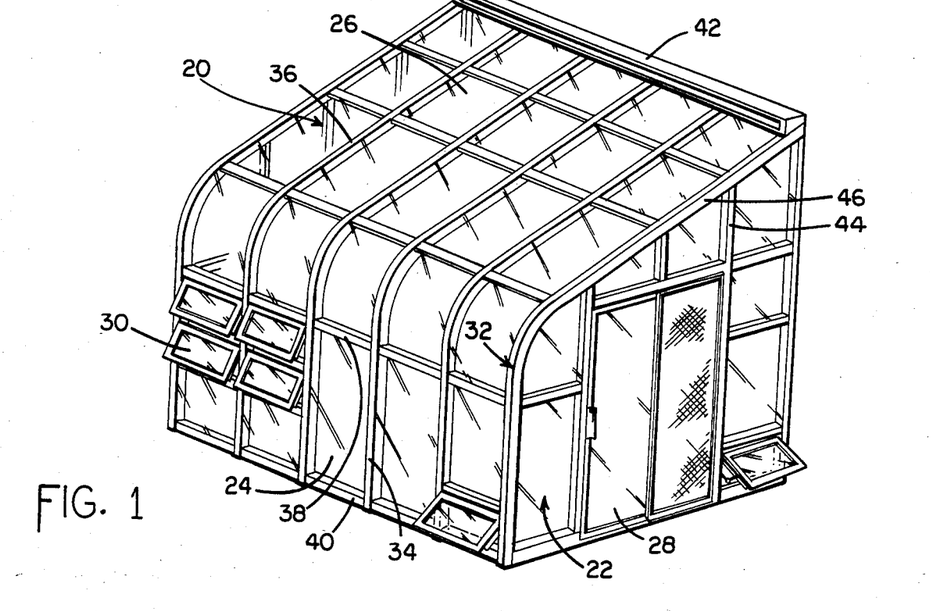
FIG. 1 is a pictorial, but somewhat diagrammatic view of a lean-to type greenhouse or solarium to which the invention applies.

A lean-to type greenhouse or solarium is shown at 20 in FIG. 1. It leans against a supporting structure (not shown) such as a dwelling with which it defines an enclosure in which may be placed plants, furniture, pools or the like. It includes two gable ends of which righthand gable end 22 is seen. The two gable ends are connected by a front 24 from which extends a sloped top or roof or eave 26 which slopes away from the associated supporting structure. One or more doors 28 and windows 30 may be conventionally provided.

The greenhouse 20 comprises a framework 32 consisting of vertical bars 34 including sloped bars 36 and also consisting of cross muntins 38. A bottom sill appears at 40 and a venting arrangement at 42. A vertical bar 44 of righthand gable end 22 and other such vertical bars support sloped bar 46.

Figure 2:
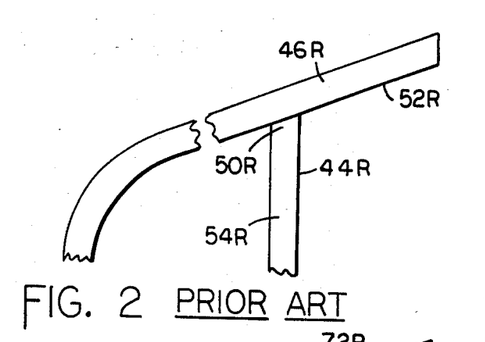
FIGS. 2 and 3 are respectively diagrammatic views of opposite end frameworks utilized in the structure of FIG. 1 according to the prior art.
Figure 3:
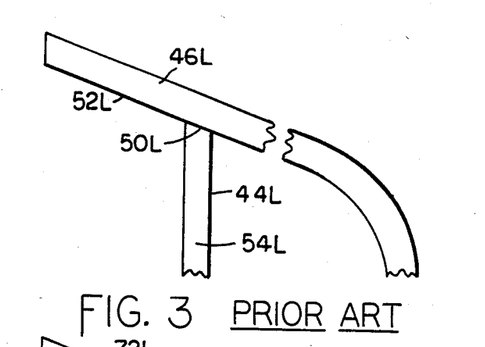

FIGS. 2 and 3 show sloped bar and associated vertical bar arrangements of the righthand and lefthand gable ends respectively but according to the prior art. The views are from the exterior of the structure. The sloped bar of the righthand gable end is designated 46R whereas the sloped bar of the lefthand gable end is indicated at 46L.

Representative gable-end vertical bars are indicated at 44R and 44L (R stands for righthand and L for lefthand). The mitred tops of bars 44R and 44L are indicated at 50R and 50L. They are sloped at the same angle as the lower surfaces 52R and 52L of sloped bars 46R and 46L which rest thereupon.

In the completed greenhouses, the framework sections of FIGS. 2 and 3 are parallel. If the vertical bars are then arranged in mirror image of one another, the faces 54R and 54L will both be the exterior faces as explained more fully below. The mitres 50R and 50L will therefore be opposite one another or, in other words, rotated 180° with respect to each other.

Figure 4:
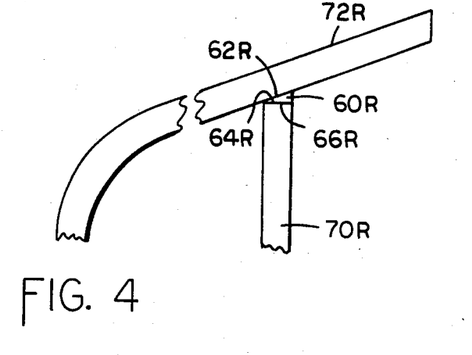
FIGS. 4 and 5 correspond respectively to FIGS. 2 and 3 but incorporate an improvement of the invention in the form of universal adaptors.
Figure 5:
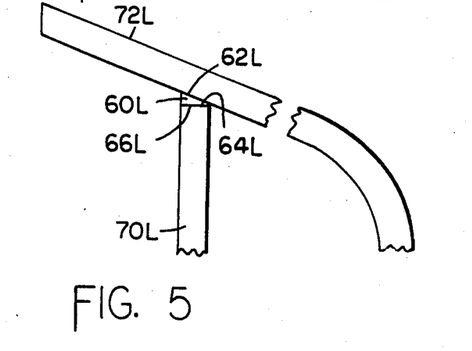

FIGS. 4 and 5 are respectively the equivalents of FIGS. 2 and 3 but show one of the improvements of the invention. This takes the form of reversible adaptors 60R and 60L which are generally wedge-shaped members having upper sloped surfaces 62R and 62L and flat horizontal lower surfaces 64R and 64L resting against the flat horizontal top ends 66R and 66L which in this case are not sloped. The vertical bars 70R and 70L with these flat tops may consequently be interchangeable and of like construction.

Figure 6:
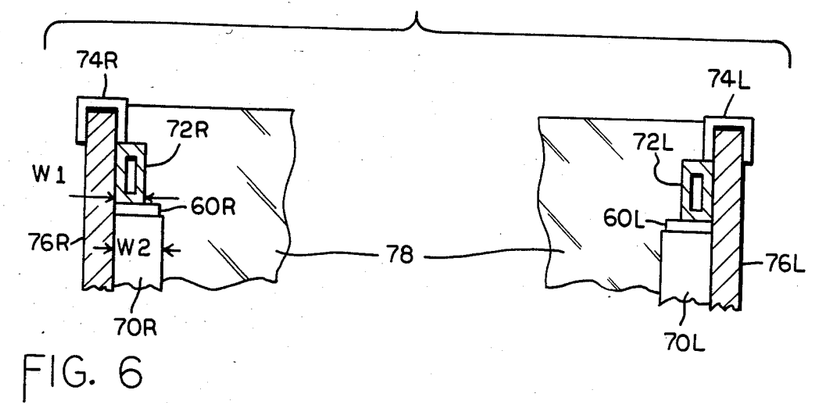
FIG. 6 is a diagrammatic view of the combined structures of FIGS. 4 and 5 taken from the interior of the greenhouse or solarium, the glazing being incorporated in part.

FIG. 6 is a view from the interior enclosure showing the relationship of vertical bars 70R and 70L and sloped bars 72R and 72L as well as wedge-shaped adaptors 60R and 60L. Herein it is seen that the width W1 of the sloped bars is less than the width W2 of the adaptor and vertical bars for a purpose to be later explained. Also seen in FIG. 6 are extrusions 74R and 74L holding in position glazing sections 76R and 76L of glass or plastic. Glazing section 78 extends between the gable ends and is shown in diagrammatic form absent its supporting bars which are not relevant to this invention.

Figure 7:
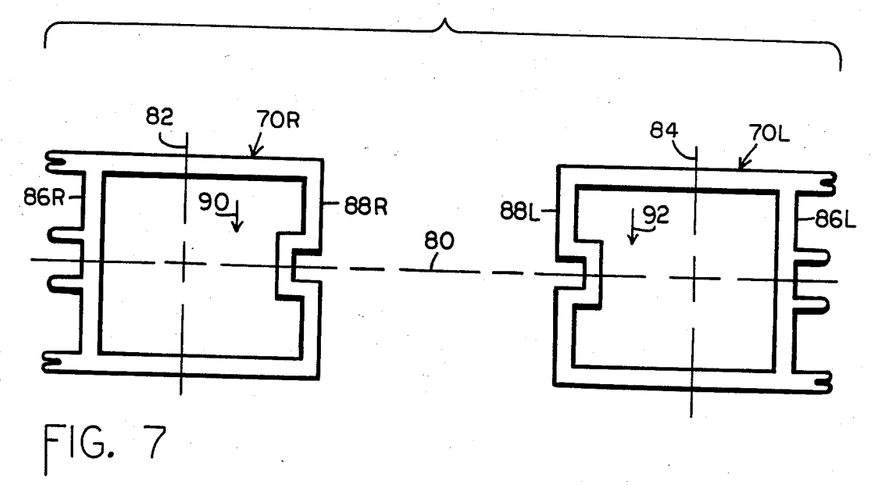
FIG. 7 diagrammatically shows the mirror image arrangement of two asymmetric cross-sections of two vertical bars in opposite gable ends of the aforementioned structures.

Since an understanding of "mirror image" and "symmetry" or lack of it is pertinent to the description herein, the cross-sections of vertical bars 70R and 70L are shown in their relative postures in FIG. 7. The spacing of these structural elements in FIG. 7 is not to scale as being irrelevant for this discussion. As will be seen bars 70R and 70L are symmetrical about axis 80. They are, however, asymmetrical about axes 82 and 84. Having one degree of asymmetry these elements are described herein generally as being asymmetrical. Their cross-sections are identical and they are in mirror image of each other (i.e., they are rotated relatively to one another by 180 degrees). The term "mirror image" as employed herein does not however preclude the lateral offsetting of these structural elements such that they may not both be aligned on the same axis 80.

The mirror image rotation is permitted in part by the fact that the tops of the bars are both flat. The arrangement keeps the exterior parts 86R and 86L outwardly directed and the interior parts 88R and 88L inwardly directed. Use of the reversible gable end adaptors of the invention accommodates the slope of the associated sloped bars. The downward slope of the adaptors is diagrammatically indicated in FIG. 7 by arrows 90 and 92 for each bar. This indicates the slope to be athwart axis 80.

Figure 8:
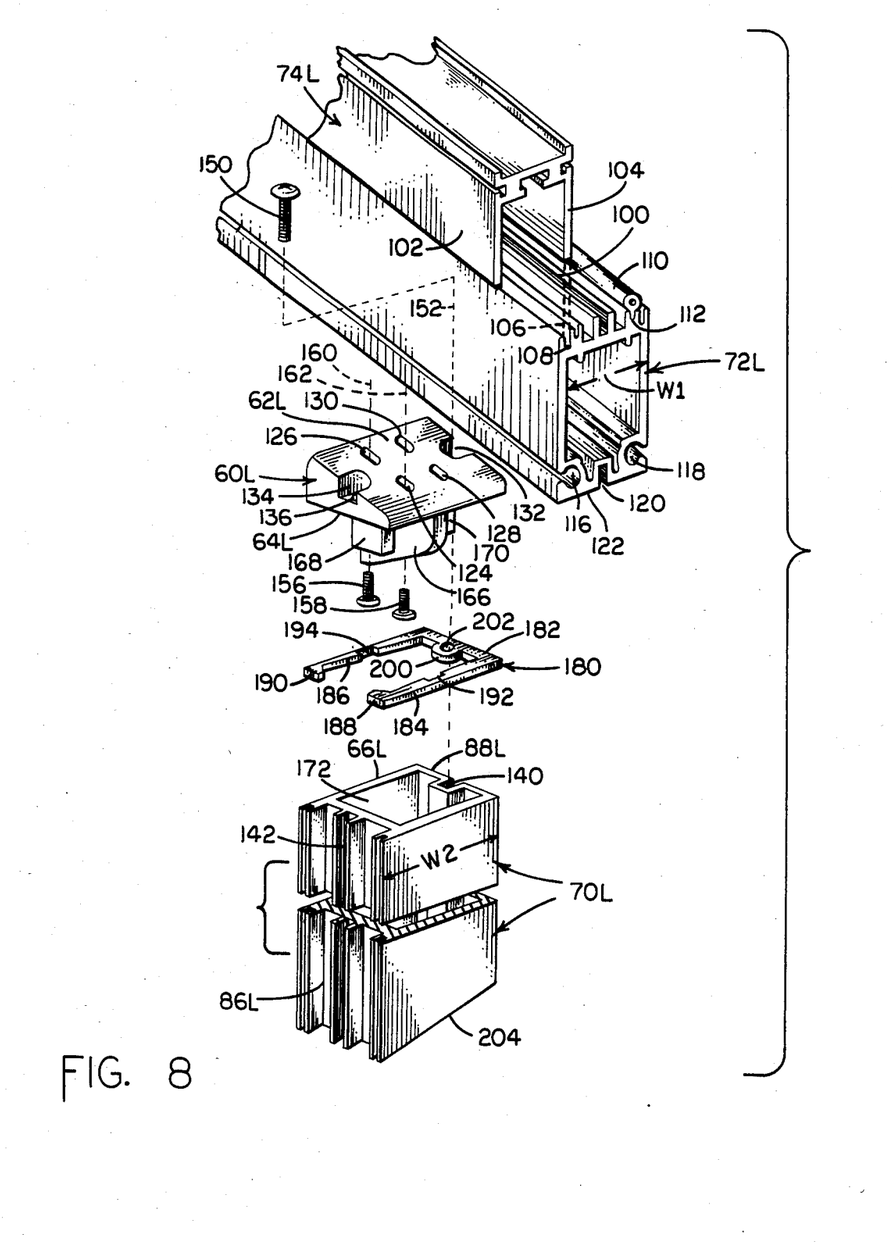
FIG. 8 is an exploded view showing how a reversible adaptor of the invention is incorporated into the framework along with a shim of the invention.
Figure 9:
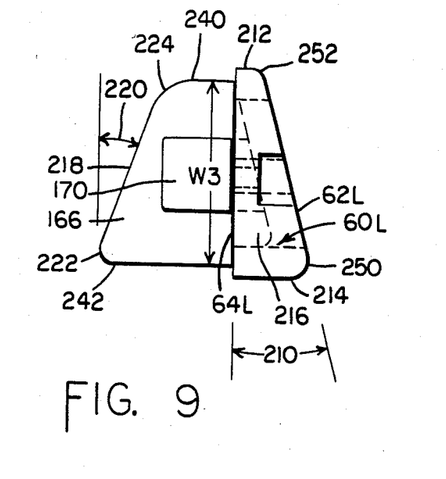
FIG. 9 is a side view of said reversible adaptor.
Figure 10:
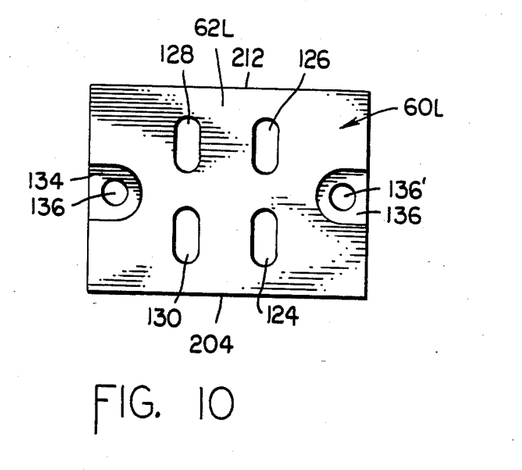
FIG. 10 is a top view of said reversible adaptor.
Figure 11:
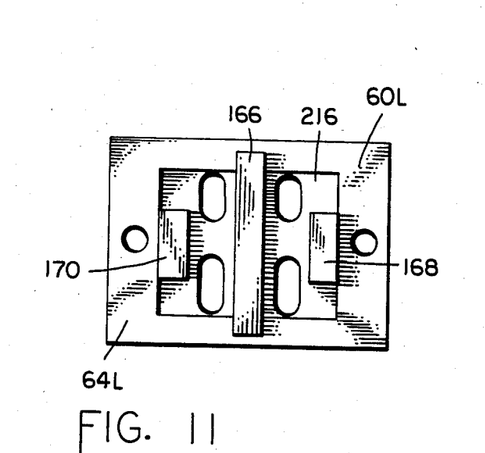
FIG. 11 is a bottom view of said reversible adaptor.
Figure 12:
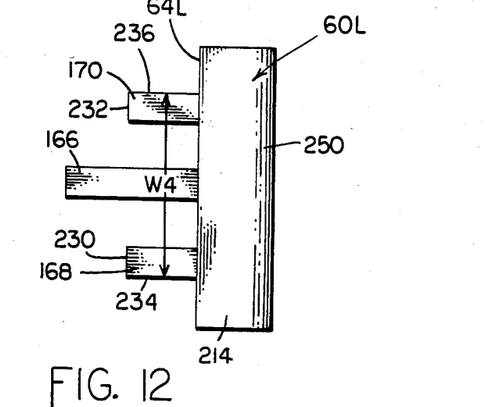
FIG. 12 is a rear view of said reversible adaptor.

FIG. 8 shows a detail of the connection of sloped bar 72L to vertical bar 70L and the support of sloped bar 72L atop vertical bar 70L by means of adaptor 60L. Also shown in this figure are the structural elements 74L and the exterior portion 86L and interior portion 88L of the vertical bar 70L as well as the sloped surface 62L and the flat bottom surface 64L of the adaptor 60L.

The purpose of structural member 74L as was seen with respect to FIG. 6 is to accommodate the upper edge of a glazing panel therein. For this purpose, structural element 74L is provided with receptacle 100 defined between channel flanges 102 and 104. As shown by dotted lines 106, flange 104 is accommodated in a groove 108 provided on the top of sloped bar 72L. A thermal break cord 110 is accommodated in a groove 112 provided on the top of sloped bar 72L as well. At the bottom of the sloped bar 72L there are provided two channels 116 and 118. These channels are intended to accommodate the bulbous peripheries of adjacent shading members employed within the greenhouse. These shading members and their association with channels 116 and 118 are described in the Four Seasons' 1983 Catalog entitled Passive Solar Greenhouses and Solarium Structures and are furthermore described in co-pending patent applications. The bottom of the sloped bar 72L is moreover provided with a longitudinally extending receptacle 120 the purpose of which is to accommodate a fastening member as will be described hereinbelow.

The upper surface 62L of adaptor 60L rests against the flat lower surface of the sloped bar 72L as indicated at 122. As will be seen, the adaptor is provided with a first pair of elongated holes 124 and 126 arranged in longitudinal alignment on a common axis. The adaptor 60L is furthermore provided with a second pair of elongated openings 128 and 130, these openings being provided on a common axis in alignment with one another. The adaptor 60L is furthermore provided with two lateral countersunk openings 132 and 134 these in turn are in alignment with two openings of which only the opening 136 is visible in FIG. 8.

The vertical member 70L is provided with a receptacle 140 extending longitudinally therealong and opening endwise at the top 66L of this vertical member. There is also provided a second longitudinally extending opening 142 which likewise opens at the top 66L. The opening associated with countersunk opening 132 in adaptor 60L is intended to cooperate with elongated opennings 124 and 126. The opening 136 in adaptor 60L is intended to cooperate with openings 128 and 130. The openings may thus be considered to be in interdigitated relationship with one set of openings bracketing some of the holes in the other set of openings.

In the illustrated arrangement a fastening member 150 in the form of a threaded bolt is intended as shown by dotted line 152 to engage in the opening associated with countersunk opening 132 thereby to engage endwise in the receptacle 140 in vertical member 70L. In so doing, the adaptor 60L is connected with the vertical member 70L. Before this takes place, however, the two fastening members 156 and 158 are passed through openings 126 and 124 as shown by dotted lines 160 and 162 thereby to engage in the receptacle 120 in the bottom of sloped member 72L thereby to connect the adaptor to the sloped member.

Due to the fact that the width W1 of the sloped member is less than the width W2 of the vertical member, the top 66L of the vertical member 70L is exposed at the side 88L thereof when the sloped member 72L is in position atop the vertical member 70L. This means that the adaptor 60L can first be attached to the bottom of the sloped member 72L and can thereafter be engaged within the vertical member 70L whereafter it is possible to insert the fastening member 150 through its hole to engage in the receptacle 140. In this case, the elongated holes 128 and 130 are not employed. Typically it is unnecessary for this arrangement to utilize the opening 136.

As will be noted, the adaptor 60L is provided with a central prong 166 and two lateral prongs 168 and 170. As will be explained hereinafter, these prongs are intended to engage in the internal chamber 172 of the vertical member 70L and to brace the adaptor 60L therein. As will be explained, the prongs have different relationships with one another and different conformations to enable a ready displacement of the adaptor prongs into the chamber 172 after the adaptor has first been mounted on the bottom of the sloped member 72L and the sloped member 72L moved into position.

A further feature of the invention as noted hereinabove, takes the form of flat shim 180. One or more of these shims may be employed to accommodate variations or tolerances in the sizes of the various elements. The utilization of the shim 180 or a plurality of the same is intended to provide a tight fit as between the structural elements 72L and 70L along with adaptor 60L with the structural members 72L and 70L being in appropriate position. As will be explained in greater detail hereinbelow, the shim 180 is a generally rectangular member but is more aptly described as being a C-shaped member having a bight 182 and two legs 184 and 186. At the ends of these legs are positioned claws 188 and 190. The insides of the legs are provided with notches 192 and 194 the purpose of which is to engage with the opposite ends of central prong 166 thereby to firmly position the shim in appropriate position. It will be noted as described hereinbelow that the legs 184 and 186 are of spreadable construction whereby to enable a snap fit over the prong 166. The rectangular periphery of the shim 180 is such as to fit appropriately to the profile of the top of the vertical member 70L whereby the shim is substantially concealed. It will be noted furthermore that the bight 182 is provided with an enlarged section 200 within which is provided an opening 202 to accommodate the passage therethrough of fastening member 150 which serves further to hold the shim in its appropriate position between the bottom of the adaptor and the top of vertical member 70L.

It will be furthermore noted that the bottom of the vertical member 70L as indicated at 204 is of sloped conformation. The purpose of this slope is to enable the accommodation and positioning of the bottom of the vertical member in an accommodating base sill (not shown). It will be observed that the slope of the bottom 204 is at right angles to the slope of the upper surface 62L of the adaptor 60L. It will also be noted that the connection of the adaptor 60L or its identical counterpart can be readily selected by the installer thereby enabling the appropriate slope to be provided in the corresponding righthand vertical member as referred to hereinabove particularly with respect to FIGS. 4–7.

The details of the adaptor 60L are shown by way of example in FIGS. 9–12 wherein are seen sloped upper surface 62L and the flat bottom surface 64L. The angle between these surfaces is shown at 210. This angle may, for example, run between 10 and 30 degrees according to requirements. Also shown in FIGS. 9–12 are prongs 166, 168 and 170 and openings 124, 126, 130 and 132. Countersunk openings 134 and 136 appear in FIG. 10 as well as opening 136 and corresponding opening 136' which was not visible in FIG. 8. The front of the adaptor construction is shown at 212 and the rear at 214. The front is substantially shorter than the rear 214 by virtue of the slope provided with respect to sloped surface 62L. Within the bottom 64L is a countersunk chamber 216. This countersunk chamber is generally of the form of the sloped surface 62L and thus generally gives the same a constant thickness over the major portion thereof.

The central prong 164 has a bottom 218 which is sloped. This slope is indicated generally at 220 and may for example, have a slope of about 15 to 30 degrees. The width of the prong 166 is indicated at W3. This width is such as to permit a relatively close fit into the corresponding dimension of the chamber 172 of the corresponding vertical member 70L. To enable insertion of the prong without difficulty, it is provided with rounded corners 222 and 224.

The bottoms of prongs 168 and 170 are indicated at 230 and 232. These bottoms are flat and lie in a common plane which is short of the bottom of the central prong 166 at the central portion of the latter. Actually, the bottoms 230 and 232 lie in a plane which intersects the corner 224 of the central prong 166. The relatively short height of the prongs 168 and 170 permit them to be readily inserted into the chamber 172 (see FIG. 8). The outer surfaces of prongs 168 and 170 are indicated at 234 and 236. They are spaced by distance W4 (see FIG. 12). This distance W4 corresponds closely to the corresponding transverse dimension of the chamber 172 so that a tight fit of these prongs within the vertical member 70L results. The opposite edges of the central prong 166 are indicated at 240 and 242 and afford the dimension W3. Generally speaking, the surfaces 234 and 236 as well as the edges 240 and 242 engage internally against the inner surface of the chamber 172 of vertical member 70L thereby holding the adaptor 60L in position and preventing lateral displacement thereof in any direction.

It will also be noted that the edges 250 and 252 of the upper surface 62L are rounded. The purpose of this is founded in the fact that the adaptor in its exposed position atop the vertical member 70L will support the associated shade (not shown) passing over the same. The rounded edges 250 and 252 provide that the adaptor will not cut into or abrade the material of the shade which will be displaceable therealong.

Figure 13:
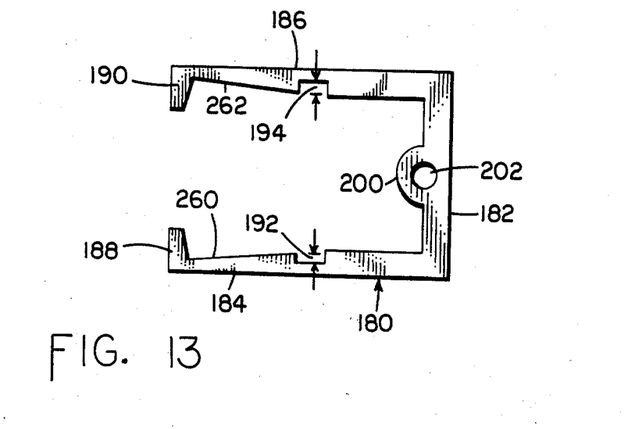
FIG. 13 is a top plan view of said shim of FIG. 8.
Figure 14:
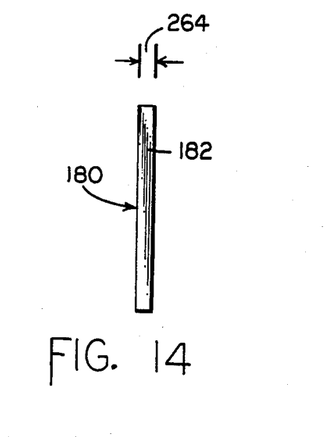
FIG. 14 is an end view of said shim.

FIGS. 13 and 14 are respectively top and end views of the shim 180 mentioned hereinabove with respect to FIG. 8. In these figures are shown the bight 182 and the legs 184 and 186 with the claws 188 and 190 thereon. Also seen is the enlarged section 200 with the opening 202 therein for purposes previously mentioned. It will furthermore be seen in FIG. 13 that the legs are provided with notches 192 and 194. These notches are the notches in which the edges 240 and 242 of the central prong 166 (See FIG. 9) are accommodated. Furthermore, the legs 184 and 186 are provided with a taper such as indicated at 260 and 262. This taper enhances the flexibility of the legs so that the claws 188 and 190 can snap over the central prong thereby to permit full insertion of the shim into positon. As indicated above, one or more shims may be employed where required. For this purpose the shims may have a thickness as indicated at 264 in the order of magnitude of 0.100 inches. The shims are preferably fabricated of plastic as are the adaptors and each of these structures are preferably monolithic members formed by a molding process or the like.

The method of the invention has been generally indicated above but may further be generalized as consisting of a technique of mounting sloped glazing bars on the flat tops of two generally identical hollow vertical bars arranged in mirror image relationship. The method or technique comprises molding two plastic wedges with prongs depending therefrom and arranging the wedges between respective of the sloped bars and flat tops with the prongs inserted into the hollow bars. The wedges are first attached to the sloped bars and then the prongs are inserted into the hollow vertical bars and the wedges then fastened to the vertical bars. In arranging the vertical bars in mirror image of one another and arranging the wedges as aforesaid the sloped bars are enabled to slope in the same general direction.

In accordance with what has been described above it will now appear that the invention provides with respect to a light permeable structure an open framework and glazing arrangement. The framework includes opposed sections including respective vertical structural members of like construction and in mirror image of each other. This framework further includes sloped members adapted to rest atop the vertical members and defining therewith and above the same wedge-shaped openings. Therein are mounted wedge shaped adaptors of like conformation mounted between the vertical and sloped members to support the sloped members on respective of the vertical members. The wedge shaped members have surfaces to rest atop the vertical members and to rest against the sloped members. The wedge shaped members are of a configuration to be interchangeably mounted between either of the vertical members and the corresponding sloped member. As a result the vertical members can be arbitrarily mountable in either of the opposed sections or gable ends so that it is necessary to provide in the assemblage or kit vertical members which are of like cross-section and which are reversibly mountable in either end of the construction.

There will now be obvious to those skilled in the art, many modifications and variations of the constructions and methods set forth hereinabove. These modifications and variations will not depart from the scope of the invention, if defined by the following claims or if equivalent thereto.

What is claimed is:

1. A light permeable structure comprising an open framework, light permeable glazing on said structure to define an enclosure, said framework including opposed sections including respective vertical structural members of like construction and in mirror image of each other, said framework further including sloped members adapted to rest atop said vertical members, and first and second wedge shaped means having like conformation mounted between the vertical and sloped members to support the sloped members on respective of the vertical members, said wedge shaped means having surfaces to rest atop the vertical members and to rest against the sloped members, said wedge shaped means being of a configuration to be interchangeably mounted between either of the vertical members and the corresponding sloped member and connectible to at least one of the same whereby the vertical members can be arbitrarily mountible in either of the opposed sections, said vertical members being hollow extrusions having like cross-sections and defining like internal bores, said wedge shaped means including prongs extending into the bores to locate and brace the wedge shaped means on the vertical members, said structure further comprising shim means between at least one of the vertical members and the associated wedge shaped means to provide a snug fit between the wedge shaped means and vertical and sloped members, the shim means being a flat generally C-shaped member with an open end to permit bypassing said prongs.

2. A light permeable structure as claimed in claim 1 wherein each vertical member has a longitudinal plane of symmetry and the associated wedge shaped means has a sloped surface which slopes athwart said plane.

3. A light permeable structure as claimed in claim 1 comprising fastening means connecting the wedge shaped means to the respective vertical and sloped members.

4. A light permeable structure as claimed in claim 3 wherein the vertical and sloped members are provided with receptacles to receive respective of said fastening means.

5. A light permeable structure as claimed in claim 4 wherein said sloped member has an elongated face facing the associated vertical member and provided with one of said receptacles running longitudinally therealong, said wedge shaped means being provided with at least one elongated opening aligned with said one receptacle and accommodating one of said fastening means.

6. A light permeable structure as claimed in claim 5 wherein each vertical member is provided with one of said receptacles opening endwise therein and the corresponding wedge shaped means is provided with a corresponding further opening to accommodate one of the fastening means.

7. A light permeable structure as claimed in claim 1 wherein the C-shaped member includes spaced legs straddling the prongs and including notches in which at least one of said prongs is engaged.

8. A light permeable structure as claimed in claim 7 wherein said C-shaped member includes a bight connecting said legs and provided with an opening corresponding with said further opening to accommodate the passage therethrough of a corresponding one of the fastening means.

9. A light permeable structure as claimed in claim 7 wherein said legs are resiliently spreadable and include claws at the respective ends thereof.

10. A light permeable structure as claimed in claim 2 wherein each vertical member has a flat top end.

11. A light permeable structure as claimed in claim 1 wherein said wedge shaped means inclusive of the corresponding prongs are each monolithic plastic members and the vertical and sloped members are respective aluminum extrusions.

12. A light permeable structure as claimed in claim 2 wherein each vertical member has a bottom which slopes transversely of said sloped surface.

13. A light permeable structure as claimed in claim 1 wherein said vertical members are wider than said sloped members.

14. A light permeable structure as claimed in claim 4 wherein each said wedge shaped means is provided with first and second interdigitated set of openings, the first set of said first wedge shaped means being aligned with the receptacles of one said vertical member and corresponding sloped member, the second set of the second wedge shaped means being aligned with the receptacles of the other said vertical member and corresponding sloped member.

15. A reversible gable adaptor for mounting a sloped bar atop a hollow vertical bar said adaptor comprising a wedge-shaped block having a generally flat bottom and a sloped top, and three flat prongs extending in spaced parallel relation from the bottom of the block, said block being provided with laterally located holes straddling the prongs and parallel therewith, said holes having enlarged portions countersunk in said sloped top, said block being furthermore provided with two sets of elongated holes parallel to and between respective pairs of said prongs.

16. A gable adaptor as claimed in claim 15 wherein the prongs are flat parallel elements arranged as two outer and one central element, the central element being wider than the two outer elements and having a sloped bottom end, the outer elements having flat bottom ends parallel with the flat bottom of said block.

17. A gable adaptor as claimed in claim 16 wherein the sloped top terminates in rounded edges.

18. A gable adaptor as claimed in claim 16 wherein the block bottom is of generally rectangular shape.

19. A gable adaptor as claimed in claim 18 comprising a flat C-shaped shim resting against said block bottom and including a bight provided with a hole aligned with one of said laterally located holes, said shim further including two parallel legs extending from said bight and straddling the central element, said legs including notches in which the central element is engaged.

* * * * *